United States Patent
Choi et al.

(10) Patent No.: US 10,785,078 B2
(45) Date of Patent: Sep. 22, 2020

(54) METHOD FOR SIGNAL MODULATION IN FILTER BANK MULTI-CARRIER SYSTEM

(71) Applicant: RESEARCH COOPERATION FOUNDATION OF YEUNGNAM UNIVERSITY, Gyeongsangbuk-do (KR)

(72) Inventors: Kwonhue Choi, Gyeongsangbuk-do (KR); Dongjun Na, Gyeongsangbuk-do (KR)

(73) Assignee: RESEARCH COOPERATION FOUNDATION OF YEUNGNAM UNIVERSITY, Gyeongsangbuk-Do (KR)

( * ) Notice: Subject to any disclaimer, the term of this patent is extended or adjusted under 35 U.S.C. 154(b) by 0 days.

(21) Appl. No.: 16/548,024

(22) Filed: Aug. 22, 2019

(65) Prior Publication Data

US 2020/0092150 A1 Mar. 19, 2020

(30) Foreign Application Priority Data

Sep. 18, 2018 (KR) .................. 10-2018-0111274

(51) Int. Cl.
*H04L 27/26* (2006.01)

(52) U.S. Cl.
CPC ........ *H04L 27/264* (2013.01); *H04L 27/2631* (2013.01)

(58) Field of Classification Search
CPC ............... H04L 27/2698; H04L 27/264; H04L 27/2614; H04L 27/265; H04L 27/263; H04B 7/0456
See application file for complete search history.

(56) References Cited

U.S. PATENT DOCUMENTS

| | | | |
|---|---|---|---|
| 2017/0134203 A1* | 5/2017 | Zhu | H04B 7/0456 |
| 2017/0134204 A1* | 5/2017 | Yun | H04L 27/2615 |
| 2018/0212813 A1* | 7/2018 | Kim | H04L 27/2636 |

FOREIGN PATENT DOCUMENTS

KR 10-1806395 B1 12/2017

* cited by examiner

*Primary Examiner* — Janice N Tieu
(74) *Attorney, Agent, or Firm* — The PL Law Group, PLLC

(57) ABSTRACT

A method for signal modulation in a filter bank multi-carrier system is provided. A modulation method according to one embodiment of the present disclosure includes generating a plurality of different candidate transmission signals by modulating a complex symbol vector including a plurality of complex symbols in a discrete Fourier transform (DFT) spread filter bank multi-carrier (FBMC)/offset quadrature amplitude modulation (OQAM) scheme and selecting a candidate transmission signal having a lowest peak power or peak-to-average power ratio (PAPR) as a transmission signal, wherein the generating of the plurality of candidate transmission signals comprises applying a different phase offset to the complex symbol vector according to a candidate transmission signal to be generated.

9 Claims, 5 Drawing Sheets

METHOD FOR SIGNAL MODULATION IN FILTER BANK MULTI-CARRIER SYSTEM

CROSS-REFERENCE TO RELATED APPLICATION(S)

This application claims the benefit under 35 USC § 119(a) of Korean Patent Application No. 10-2018-0111274, filed on Sep. 18, 2018, in the Korean Intellectual Property Office, the entire disclosure of which is incorporated herein by reference for all purposes.

BACKGROUND

1. Field

The following description relates to a filter bank multi-carrier technology.

2. Description of Related Art

A filter bank multi-carrier (FBMC) modulation technique using a plurality of subcarriers has entered the spotlight as a modulation technique for fifth-generation (5G) wireless communication. However, in the FBMC modulation technique, a high peak-to-average power ratio (PAPR) characteristic is exhibited due to overlapping of a plurality of subcarrier signals.

Particularly, in an FBMC/offset quadrature amplitude modulation (OQAM) technique, there is a problem in that a single carrier effect cannot be obtained due to a structural problem of OQAM even when discrete Fourier transform (DFT) spreading is applied as in a single carrier-frequency division multi access (SC-FDMA) technique.

In order to address such a problem, Korean Patent Registration No. 10-1806395 suggests a technique in which after a plurality of candidate transmission signals, which are modulated according to a DFT spread FBMC/OQAM scheme and are capable of obtaining a single carrier effect, are generated, a candidate transmission signal with a low PAPR is selected and transmitted, thereby effectively improving a PAPR performance. In this prior art, correct modulation is possible only when on a reception side it can be identified which candidate transmission signal is selected and transmitted. Therefore, there is a problem in that information on a switching operation performed in the modulation process for generating a candidate transmission signal selected as a transmission signal needs to be transmitted as side (additional) information together with a transmission signal.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The disclosed embodiments are intended to provide a filter bank multi-carrier signal modulation apparatus and method which reduce a peak-to-average power ratio (PAPR) and do not require transmission of side (additional) information.

In one general aspect, a modulation method includes generating a plurality of different candidate transmission signals by modulating a complex symbol vector including a plurality of complex symbols in a discrete Fourier transform (DFT) spread filter bank multi-carrier (FBMC)/offset quadrature amplitude modulation (OQAM) scheme and selecting a candidate transmission signal having a lowest peak power or PAPR as a transmission signal, wherein the generating of the plurality of candidate transmission signals comprises applying a different phase offset to the complex symbol vector according to a candidate transmission signal to be generated.

Other features and aspects will be apparent from the following detailed description, the drawings, and the claims.

Figure 1:
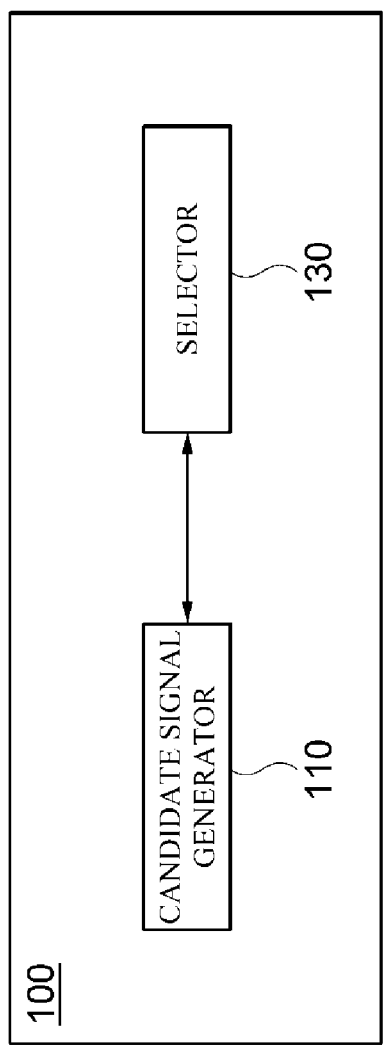
FIG. 1 is a diagram illustrating a configuration of a modulation apparatus according to one embodiment of the present disclosure.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art.

Descriptions of well-known functions and constructions may be omitted for increased clarity and conciseness. Also, terms described in below are selected by considering functions in the embodiment and meanings may vary depending on, for example, a user or operator's intentions or customs. Therefore, definitions of the terms should be made on the basis of the overall context. The terminology used in the detailed description is provided only to describe embodiments of the present disclosure and not for purposes of limitation. Unless the context clearly indicates otherwise, the singular forms include the plural forms. It should be understood that the terms "comprises" or "includes" specify some features, numbers, steps, operations, elements, and/or combinations thereof when used herein, but do not preclude the presence or possibility of one or more other features, numbers, steps, operations, elements, and/or combinations thereof in addition to the description.

FIG. 1 is a diagram illustrating a configuration of a modulation apparatus according to one embodiment of the present disclosure.

Referring to FIG. 1, the modulation apparatus 100 according to one embodiment of the present disclosure includes a candidate signal generator 110 and a selector 130.

The candidate signal generator 110 generates a plurality of candidate transmission signals by modulating a complex symbol vector including a plurality of complex symbols to be input in parallel using a discrete Fourier transform (DFT) spread filter bank multi-carrier (FBMC)/offset quadrature amplitude modulation (OQAM) scheme, wherein a different phase offset is applied to a complex symbol vector according to the candidate transmission signal to be generated.

In this case, the complex symbols may be generated using various types of digital modulation schemes, for example, quadrature phase shift keying (QPSK), quadrature amplitude modulation (QAM), and the like, which can convert a digital signal into a symbol having a predetermined coordinate group on a complex plane Meanwhile, each of the plurality of candidate transmission signals generated by the candidate signal generator 110 is a superposition of equally time-shifted subcarriers. Specifically, subcarriers forming the same candidate transmission signal are equally time-shifted, but a time shift between subcarriers forming different candidate transmission signals may be the same or different.

The selector 130 selects a signal with the lowest peak-to-average power ratio (PAPR) from among the plurality of candidate transmission signals generated by the candidate signal generator 110.

Figure 2:
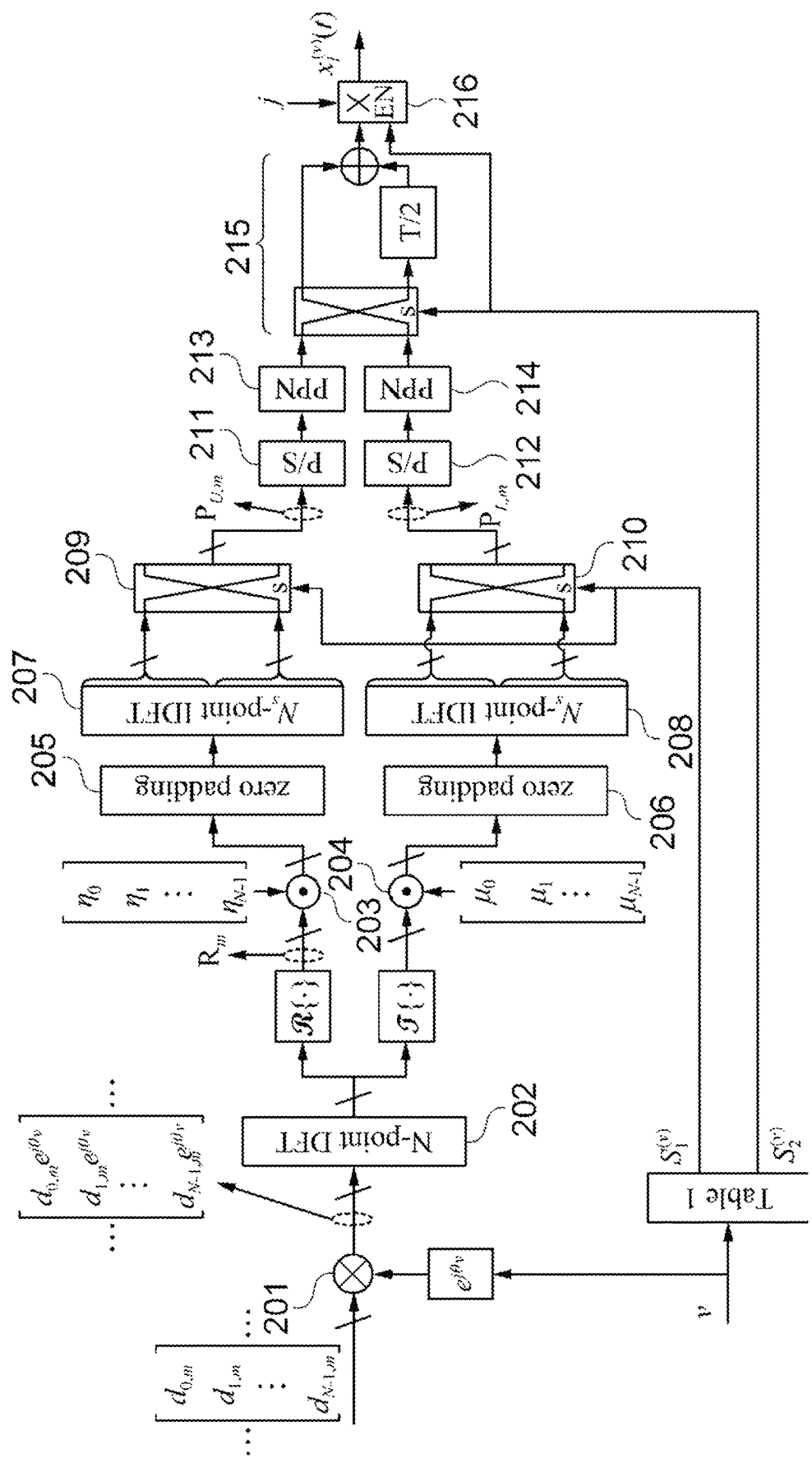
FIG. 2 is a diagram illustrating a process of generating a candidate transmission signal according to one embodiment of the present disclosure.

FIG. 2 is a diagram illustrating a process of generating a candidate transmission signal according to one embodiment of the present disclosure.

Referring to FIG. 2, first, an $m^{th}$ complex symbol $d_{n,m}$ to be transmitted over an $n^{th}$ subcarrier among complex symbols included in a complex symbol vector may be represented by Equation 1 below.

$$d_{n,m} = a_{n,m} + jb_{n,m}, 0 \leq n \leq N-1, 0 \leq m \leq M-1 \quad \text{[Equation 1]}$$

Here, n denotes a frequency index of a subcarrier, m denotes an index indicating a transmission order of a complex symbol, $a_{n,m}$ denotes a real part symbol of $d_{n,m}$, $b_{n,m}$ denotes an imaginary part symbol of $d_{n,m}$, N denotes the number of subcarriers, and M denotes a size of a data frame (i.e., the number of complex data symbols included in one data frame). Hereinafter, $a_{n,m}$, $b_{n,m}$, $d_{n,m}$, n, N, and M will be considered to have the same meanings as described above.

Meanwhile, the complex symbol vector $d_{n,m}$ may be represented by Equation 2 below.

$$d_{n,m} = [d_{n,m}]_{n=0}^{N-1} = [d_{0,m}, d_{1,m}, \ldots, d_{N-1,m}]^T \quad \text{[Equation 2]}$$

The candidate signal generator 110 applies a different phase offset to a complex symbol vector according to a candidate transmission signal to be generated (201). In this case, the phase offset is used to rotate a constellation of each complex symbol included in the complex symbol vector by a predetermined angle and the complex symbol to which the phase offset is applied may be represented by Equation 3 below.

$$d_{n,m}^{(v)} = d_{n,m} e^{j\theta_v} \quad \text{[Equation 3]}$$

Here, v denotes an index of a candidate transmission signal to be generated, and hereinafter will be considered to have the same meaning.

Meanwhile, a phase offset $\theta_v$ may be determined according to a candidate transmission signal to be generated, as shown in Equation 4 below.

$$\theta_v = \frac{(v-1)\pi}{2V}, v = 1, 2, 3, \ldots, V \quad \text{[Equation 4]}$$

Here, V denotes the number of candidate transmission signals. Hereinafter, for convenience of explanation, it is assumed that V=4, but V may be changed according to embodiments.

Thereafter, the candidate signal generator 110 performs DFT on the complex symbol vector to which the phase offset is applied, thereby spreading the complex symbol vector in a frequency domain (202).

In this case, a DFT spread symbol $D_{n,m}^{(v)}$ which is generated by performing DFT may be represented by Equation 5 below.

$$D_{n,m}^{(v)} = A_{n,m}^{(v)} + jB_{n,m}^{(v)}, 0 \leq n \leq N-1, 0 \leq m \leq M-1 \quad \text{[Equation 5]}$$

Here, $A_{n,m}^{(v)}$ denotes a real part symbol of $D_{n,m}^{(v)}$ and $B_{n,m}^{(v)}$ denotes an imaginary part symbol of $D_{n,m}^{(v)}$. Hereinafter, these will be considered to have the same meanings as above.

In addition, a DFT spread symbol vector $D_{n,m}^{(v)}$ including DFT spread symbols may be represented by Equation 6 below.

$$D_{n,m}^{(v)} = [D_{n,m}^{(v)}]_{n=0}^{N-1} = [D_{0,m}^{(v)}, \ldots, D_{N-1,m}^{(v)}]^T \quad \text{[Equation 6]}$$

Thereafter, the candidate signal generator 110 generates a candidate transmission signal by modulating the DFT spread symbol vector in an FBMC/OQAM scheme. In this case, the candidate signal generator 110 generates a different candidate transmission signal according to an applied phase offset.

Specifically, the candidate signal generator 110 divides each symbol included in the DFT spread symbol vector into a real part symbol and an imaginary part symbol and shifts a phase (203 and 204). At this time, the phase shift may be performed by multiplying the real part symbol and the imaginary part symbol by a phase shift coefficient that satisfies Equation 7 below.

$$\eta_n = j^n, \mu_n = j(-j)^n \quad \text{[Equation 7]}$$

Here, $\eta_n$ denotes a phase shift coefficient to be multiplied to a real part symbol to be transmitted over the $n^{th}$ subcarrier and $\mu_n$ denotes a phase shift coefficient to be multiplied to an imaginary part symbol to be transmitted over the $n^{th}$ subcarrier.

Then, the candidate signal generator 110 pads a value of zero to each of the phase-shifted real part symbol vector and the phase-shifted imaginary part symbol vector (205 and 206) and then performs inverse discrete Fourier transform (IDFT) (207 and 208).

Thereafter, the candidate signal generator 110 outputs an output vector of each IDFT intact on the basis of a switching control bit $S_1^{(v)}$ which is determined according to the applied phase offset, or outputs an output vector of each IDFT by cyclically shifting the output vector by Ns/2 (here, Ns is an output vector size of IDFT) (209 and 210). Specifically, when $S_1^{(v)}=0$, the candidate signal generator 110 outputs the output vector without changing the order of symbols included in the output vector output from each IDFT. On the contrary, when $S_1^{(v)}=1$, the candidate signal generator 110 outputs the output vector by cyclically shifting symbols included in the output vector output from each IDFT by Ns/2. For example, assuming vector $V=[V_1, V_2, V_3, V_4]^T$ including four symbols (i.e., Ns=4), vector $V'=[V_3, V_4, V_1, V_2]^T$ is obtained in which each of the symbols included in V is cyclically shifted by Ns/2.

Then, the candidate signal generator 110 performs parallel/serial conversion on each of output vectors $P_{U,m}$ and $P_{L,m}$ which are output according to the switching control bit $S_1^{(v)}$ (211 and 212), and generates a real part modulated signal and an imaginary part modulated signal by performing filtering using a poly phase network (PPN) (213 and 214).

Then, the candidate signal generator 110 overlaps the real part modulated signal and the imaginary part modulated signal with a difference of half of a symbol period in a time domain on the basis of a switching control bit $S_2^{(v)}$ that is determined according to the applied phase offset (215). Specifically, when $S_2^{(v)}=0$, the candidate signal generator 110 may overlap an imaginary part modulated signal, which is output from a lower PPN, and a real part modulated signal, which is output from an upper PPN, after delaying the imaginary part modulated signal by T/2 on a time axis. On the contrary, when $S_2^{(v)}=1$, the candidate signal generator 110 may overlap a real part modulated signal, which is output from an upper PPN, and an imaginary part modulated signal, which is output from a lower PPN, after delaying the real part modulated signal by T/2 on the time axis.

Thereafter, the candidate signal generator 110 generates a candidate transmission signal by multiplying an imaginary number j to the signal which is a superposition of the real part modulated signal and the imaginary part modulated signal in accordance with the switching control bit $S_2^{(v)}$ (216). Specifically, when $S_2^{(v)}=0$, the candidate signal generator 110 generates a candidate transmission signal in which the imaginary number j is not multiplied. On the contrary, when $S_2^{(v)}=1$, the candidate signal generator 110 generates a candidate transmission signal in which the imaginary number j is multiplied.

Meanwhile, the switching control bits $S_1^{(v)}$ and $S_2^{(v)}$ are determined according to an applied phase offset, as shown in Table 1 below.

TABLE 1

| v | Phase offset ($\theta_v$) | $S_1^{(v)}$ | $S_2^{(v)}$ |
|---|---|---|---|
| 1 | 0 | 0 | 0 |
| 2 | π/8 | 1 | 0 |
| 3 | 2π/8 | 1 | 1 |
| 4 | 3π/8 | 0 | 1 |

Meanwhile, the candidate signal generator 110 generates a plurality of candidate transmission signals for each of consecutive data blocks generated by dividing one data frame, and a plurality of candidate transmission signals for an $l^{th}$ data block (here, 1 is a real number satisfying 0≤1≤L−1, where L is the number of data blocks) are obtained according to the phase offsets $S_1^{(v)}$ and $S_2^{(v)}$, as shown in Equation 8 below.

$$x_l^{(v)}(t) = \sum_{m=lW}^{(l+1)W-1} \sum_{n=0}^{N-1} A_{n,m}^{(v)} p_{n,m}^{(v)}(t) + B_{n,m}^{(v)} q_{n,m}^{(v)}(t)\}, v=1,2,3,4 \quad [\text{Equation 8}]$$

In Equation 8, W denotes a size of a data block and $p_{n,m}^{(v)}(t)$ and $q_{n,m}^{(v)}(t)$ are represented by Equations 9 and 10 below, respectively.

$$p_{n,m}^{(v)} = \begin{cases} h(t-mT)e^{jn\frac{2\pi}{T}(t+\frac{T}{4})} & \text{if } v=1 \\ h(t-mT)e^{jn\frac{2\pi}{T}(t-\frac{T}{4})} & \text{if } v=2 \\ jh\left(t-\frac{T}{2}-mT\right)e^{jn\frac{2\pi}{T}(t+\frac{T}{4})} & \text{if } v=3 \\ jh\left(t-\frac{T}{2}-mT\right)e^{jn\frac{2\pi}{T}(t-\frac{T}{4})} & \text{if } v=4 \end{cases} \quad [\text{Equation 9}]$$

$$q_{n,m}^{(v)} = \begin{cases} jh\left(t-\frac{T}{2}-mT\right)e^{jn\frac{2\pi}{T}(t+\frac{T}{4})} & \text{if } v=1 \\ jh\left(t-\frac{T}{2}-mT\right)e^{jn\frac{2\pi}{T}(t-\frac{T}{4})} & \text{if } v=2 \\ -h(t-mT)e^{jn\frac{2\pi}{T}(t+\frac{T}{4})} & \text{if } v=3 \\ -h(t-mT)e^{jn\frac{2\pi}{T}(t-\frac{T}{4})} & \text{if } v=4 \end{cases} \quad [\text{Equation 10}]$$

In Equations 9 and 10, T denotes a symbol period of $d_{n,m}$.

As can be seen from Equations 8 to 10, each of the plurality of candidate transmission signals generated by the candidate signal generator 110 is a superposition of a plurality of subcarrier signals that are equally time-shifted. Specifically, each of candidate transmission signals $x_l^{(1)}(t)$ and $x_l^{(3)}(t)$ consists of subcarrier signals which are time-shifted by T/4 and each of candidate transmission signals $x_l^{(2)}(t)$ and $x_l^{(4)}(t)$ consists of subcarrier signals which are time-shifted by −T/4.

In the above-described embodiment, it is assumed that $d_{n,m}$ is a QPSK symbol and a $c^{th}$ candidate transmission signal $x_l^{(c)}(t)$ among the plurality of candidate transmission signals generated by the candidate signal generator 110 is selected and transmitted. In this case, when demodulation is performed under the assumption that the first candidate transmission signal $x_l^{(1)}(t)$ is selected and transmitted, the $m^{th}$ complex symbol vector $[r_{n,m}]_{n=0}^{N-1}$ to be demodulated may be represented by Equation 11 below.

$$[r_{n,m}]_{n=0}^{N-1} = [\tilde{d}_{n,m}]_{n=0}^{N-1} e^{j\theta_c} \quad [\text{Equation 11}]$$

In this case, when a definition is given as $[\tilde{d}_{n,m}]_{n=0}^{N-1} \equiv [\tilde{d}_{0,m}, \tilde{d}_{1,m}, \ldots, \tilde{d}_{N-1,m}]^T$, $[\tilde{d}_{n,m}]_{n=0}^{N-1}$ satisfies one of Equations 12 to 15 below according to an actually transmitted candidate transmission signal.

1) In a case where the first candidate transmission signal (i.e., $x_l^{(1)}(t)$) is selected and transmitted, $$[\tilde{d}_{n,m}]_{n=0}^{N-1} = [d_{n,m}]_{n=0}^{N-1} \quad [\text{Equation 12}]$$

In this case, $[\tilde{d}_{n,m}]_{n=0}^{N-1}$ matches $[d_{n,m}]_{n=0}^{N-1}$.

2) In a case where the second candidate transmission signal (i.e., $x_l^{(2)}(t)$) is selected and transmitted $$[\tilde{d}_{n,m}]_{n=0}^{N-1} = [[[d_{n,m}]_{n=N/2}^{N-1}]^T, [[d_{n,m}]_{n=0}^{N/2-1}]^T]^T \quad [\text{Equation 13}]$$

In this case, $[\tilde{d}_{n,m}]_{n=0}^{N-1}$ is the same as what is obtained when positions of $0^{th}$ to $(N/2-1)^{th}$ complex symbols are swapped with positions of the N/2th to (N−1)th complex symbols in $[d_{n,m}]_{n=0}^{N-1}$. Therefore, each of the complex symbols included in $[\tilde{d}_{n,m}]_{n=0}^{N-1}$ still has one of the values in the coordinate group of QPSK.

3) In a case where the third candidate transmission signal (i.e., $x_l^{(3)}(t)$) is selected and transmitted, $$[\tilde{d}_{n,m}]_{n=0}^{N-1} = j[d_{n,m}]_{n=0}^{N-1} \quad [\text{Equation 14}]$$

In this case, $[\tilde{d}_{n,m}]_{n=0}^{N-1}$ is the same as what is obtained when $[d_{n,m}]_{n=0}^{N-1}$ is multiplied by an imaginary number j. Meanwhile, since {−1+j, 1+j, −1−j, 1−j} is obtained by multiplying a coordinate group {1+j, 1−j, −1+j, −1−j} of a QPSK symbol by the imaginary number j, each of the complex symbols included in $[\tilde{d}_{n,m}]_{n=0}^{N-1}$ still has one of the values in a coordinate group of QPSK.

4) In a case where the fourth candidate transmission signal (i.e., $x_l^{(4)}(t)$) is selected and transmitted, $$[\tilde{d}_{n,m}]_{n=0}^{N-1} = j\left[[[d_{n,m}]_{n=N/2}^{N-1}]^T, [[d_{n,m}]_{n=0}^{N/2-1}]^T\right]^T \quad \text{[Equation 15]}$$

In this case, $[\tilde{d}_{n,m}]_{n=0}^{N-1}$ is the same as what is obtained when $[d_{n,m}]_{n=0}^{N-1}$ is multiplied by an imaginary number j and then positions of $0^{th}$ to $(N/2-1)^{th}$ symbols are swapped with positions of the $N/2^{th}$ to $(N-1)^{th}$ symbols. Therefore, each of the complex symbols included in $[\tilde{d}_{n,m}]_{n=0}^{N-1}$ still has one of the values in a coordinate group of QPSK.

Consequently, as described above, it is seen that a constellation of the complex symbols included in $[\tilde{d}_{n,m}]_{n=0}^{N-1}$ is the same as a constellation of a QPSK symbol irrespectively of whether which candidate transmission signal is selected and transmitted. Thus, in the above example, the constellation of $[r_{n,m}]_{n=0}^{N-1}$ is the same as in the example shown in FIGS. 3A to 3D.

Figure 3A:
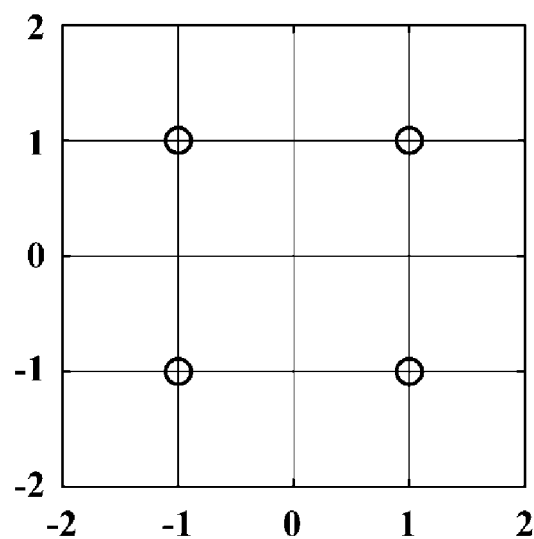
FIGS. 3A to 3D illustrate constellations of a demodulated complex symbol vector according to one embodiment of the present disclosure.

Specifically, referring to FIGS. 3A to 3D, when a candidate transmission signal transmitted is $x_l^{(1)}(t)$, $[r_{n,m}]_{n=0}^{N-1}$ has the same constellation as that of the QPSK symbol, as shown in FIG. 3A.

Figure 3B:
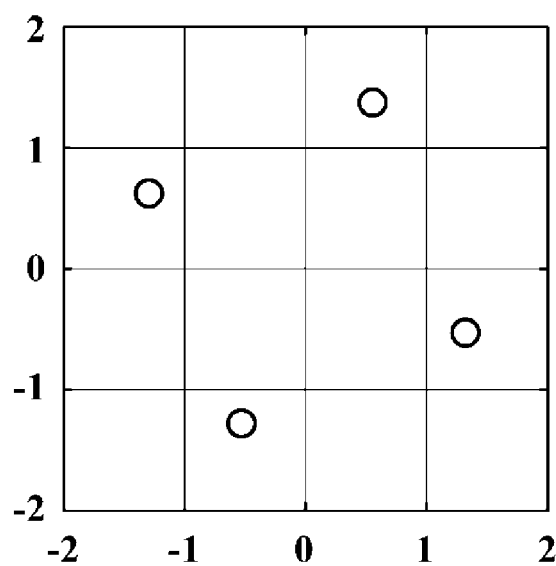

In addition, when a candidate transmission signal transmitted is $x_l^{(2)}(t)$, $[r_{n,m}]_{n=0}^{N-1}$ has the same constellation as a constellation obtained by rotating a constellation of the QPSK symbol by $\theta_2$, as shown in FIG. 3B.

Figure 3C:
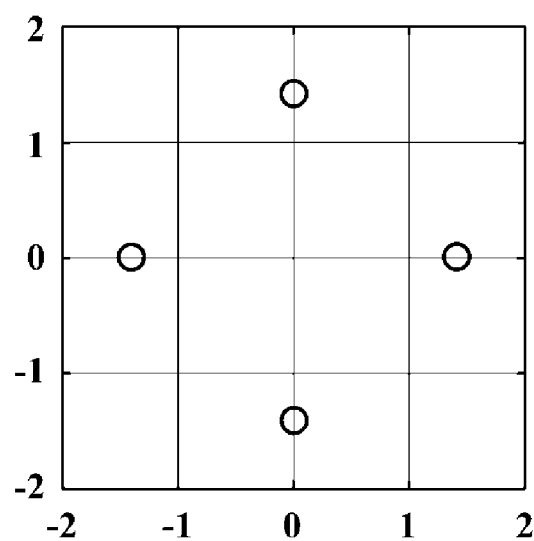

Also, when a candidate transmission signal transmitted is $x_l^{(3)}(t)$, $[r_{n,m}]_{n=0}^{N-1}$ has the same constellation as a constellation obtained by rotating a constellation of the QPSK symbol by $\theta_3$, as shown in FIG. 3C.

Figure 3D:
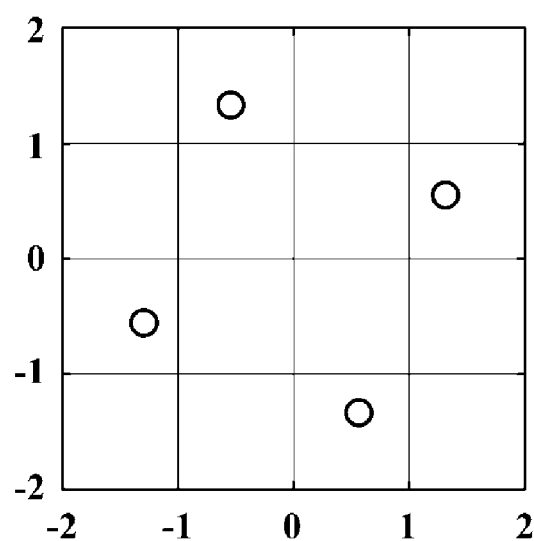

Moreover, when a candidate transmission signal transmitted is $x_l^{(4)}(t)$, $[r_{n,m}]_{n=0}^{N-1}$ has the same constellation as a constellation obtained by rotating a constellation of the QPSK symbol by $\theta_4$, as shown in FIG. 3D.

That is, $r_{n,m}$ is a QPSK symbol in which a phase is shifted by a phase offset that is applied to the transmitted candidate transmission signal. Therefore, on a reception side, a phase offset applied to a candidate transmission signal may be estimated according to degrees of rotation obtained by comparing a constellation of $[r_{n,m}]_{n=0}^{N-1}$ and a constellation of the QPSK symbol and a candidate transmission signal which has been selected and transmitted may be determined on the basis of the estimated phase offset.

Specifically, on the reception side, the biquadrate of $r_{n,m}$ is calculated as shown in Equation 16 below in order to estimate a phase offset.

$$(r_{n,m})^4 = (\tilde{d}_{n,m})^4 e^{j4\theta_c} \quad \text{[Equation 16]}$$

Here, since $(\tilde{d}_{n,m})^4 = (\pm 1 \pm 1j)^4 = -4$, Equation 16 may be summarized as follows:

$$(r_{n,m})^4 = -4 e^{j4\theta_c} \quad \text{[Equation 17]}$$

Meanwhile, a phase component $\varphi_c$ of $(r_{n,m})^4$ may be expressed by Equation 18 below and assuming an ideal wireless communication environment, Equation 19 may be satisfied according to the transmitted candidate transmission signal.

$$\varphi_c (\equiv \angle(-(r_{n,m})^4)) = \angle(4e^{j4\theta_c}) = 4\theta_c \quad \text{[Equation 18]}$$

$$\varphi_c = \frac{(c-1)\pi}{2} = \begin{cases} 0 & \text{for } c=1 \\ \pi/2 & \text{for } c=2 \\ \pi & \text{for } c=3 \\ 3\pi/2 & \text{for } c=4 \end{cases} \quad \text{[Equation 19]}$$

Meanwhile, $\hat{\varphi}_c$ that is an estimate of $\varphi_c$ does not match $\varphi_c$ in an actual wireless communication environment where a channel fading effect and noise are present, and hence $\hat{c}$ that is an estimate of c may be determined according to rules as shown in Equation 20.

$$\hat{c} = \begin{cases} 1 & \text{if } 0 < \text{mod}(\hat{\varphi}_c, 2\pi) \leq \frac{\pi}{4} \text{ or,} \\ & \frac{7\pi}{4} < \text{mod}(\hat{\varphi}_c, 2\pi) \leq 2\pi \\ 2 & \text{if } \frac{\pi}{4} < \text{mod}(\hat{\varphi}_c, 2\pi) \leq \frac{3\pi}{4} \\ 3 & \text{if } \frac{3\pi}{4} < \text{mod}(\hat{\varphi}_c, 2\pi) \leq \frac{5\pi}{4} \\ 4 & \text{if } \frac{5\pi}{4} < \text{mod}(\hat{\varphi}_c, 2\pi) \leq \frac{7\pi}{4} \end{cases} \quad \text{[Equation 20]}$$

In Equation 20, mod(x,y) denotes the remainder when x is divided by y.

When the estimate value $\hat{c}$ is determined according to Equation 20, the transmitted complex symbol vector may be estimated according to the determined $\hat{c}$ on the reception side as shown in Equation 21 below.

$$[r_{n,m}^{comp}]_{n=0}^{N-1} = \begin{cases} [r_{n,m}]_{n=0}^{N-1} & \text{if } \hat{c}=1 \\ e^{-j\frac{\pi}{8}(=\theta_2)}[[r_{n,m}]_{n=N/2}^{N-1}[r_{n,m}]_{n=0}^{N/2-1}] & \text{if } \hat{c}=2 \\ e^{-j\frac{\pi}{4}(=\theta_3)} / j[r_{n,m}]_{n=0}^{N-1} & \text{if } \hat{c}=3 \\ e^{-j\frac{\pi}{8}(=\theta_2)} / j[[r_{n,m}]_{n=N/2}^{N-1}[r_{n,m}]_{n=0}^{N/2-1}] & \text{if } \hat{c}=3 \end{cases} \quad \text{[Equation 21]}$$

Figure 4:
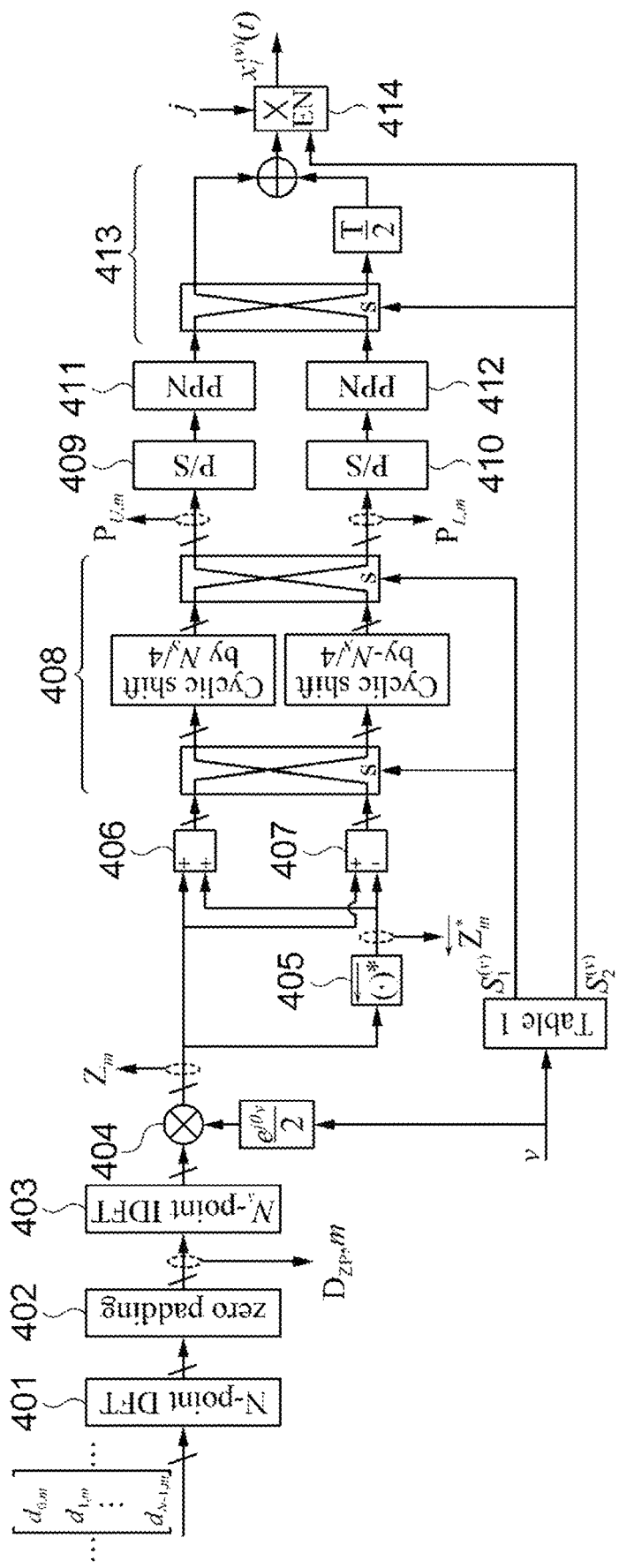
FIG. 4 is a diagram illustrating a process of generating a candidate transmission signal according to another embodiment of the present disclosure.

FIG. 4 is a diagram illustrating a process of generating a candidate transmission signal according to another embodiment of the present disclosure.

Referring to FIG. 4, the candidate signal generator 110 performs DFT on a complex symbol vector to spread complex symbols included in the complex symbol vector in a frequency domain, thereby generating a DFT spread symbol vector (401) and pads a value of zero to the DFT spread symbol vector (402).

Thereafter, the candidate signal generator 110 performs IDFT on the DFT spread symbol vector $D_{ZP,m}$ to which the value of zero has been padded (403), and then applies a phase offset to a resultant symbol vector to generate a symbol vector $Z_m$ (404). In this case, the phase offset satisfies the above Equation 4 according to a candidate transmission signal to be generated.

Then, the candidate signal generator 110 generates a conjugate reverse vector $\overleftarrow{Z_m^*}$ that includes conjugate symbols for the symbols included in $Z_m$, in reverse order. For example, when $Z_m = [Z_{0,m}, Z_{1,m}, Z_{2,m}, \ldots, Z_{N_s-1,m}]^T$, it may be obtained that $\overleftarrow{Z_m^*} = [Z_{N_s-1,m}^*, Z_{N_s-2,m}^*, Z_{N_s-3,m}^*, \ldots, Z_{0,m}^*]^T$.

Then, the candidate signal generator 110 generates $Z_m + \overleftarrow{Z_m^*}$ and $Z_m - \overleftarrow{Z_m^*}$ (406 and 407), and then cyclically shifts symbols included in each of $Z_m + \overleftarrow{Z_m^*}$ and $Z_m - \overleftarrow{Z_m^*}$ on the basis of a switching control bit $S_1^{(v)}$ that varies according to the applied phase offset (408).

Specifically, when $S_1^{(v)} = 0$, the candidate signal generator 110 cyclically shifts the symbols included in $Z_m + \overleftarrow{Z_m^*}$ by Ns/4 and outputs the result, and cyclically shifts the symbols included in $Z_m - \overline{Z_m^*}$ by $-N_s/4$ and outputs the result. For example, assuming vector $V=[V_1, V_2, V_3, V_4]^T$ including four symbols (i.e., Ns=4), vector V' obtained by cyclically shifting the symbols included in V by Ns/4 becomes $[V_4, V_1, V_2, V_3]^T$ and V" obtained by cyclically shifting the symbols included in V by $-N_s/4$ becomes $[V_2, V_3, V_4, V_1]^T$.

Accordingly, when $S_1^{(v)}=0$, output vectors $P_{U,m}$ and $P_{L,m}$ to be output may be represented by Equations 22 and 23, respectively.

$$P_{U,m} = \underset{N_s/4}{CyclicShift}\{Z_m + \overline{Z_m^*}\} \quad \text{[Equation 22]}$$

$$P_{L,m} = \underset{-N_s/4}{CyclicShift}\{Z_m - \overline{Z_m^*}\} \quad \text{[Equation 23]}$$

Meanwhile, when $S_1^{(v)}=1$, the candidate signal generator 110 cyclically shifts the symbols included in $Z_m + \overline{Z_m^*}$ by $-N_s/4$ and outputs the result and cyclically shifts the symbols included in $Z_m - \overline{Z_m^*}$ by $N_s/4$ and outputs the result. Accordingly, when $S_1^{(v)}=1$, output vectors $P_{U,m}$ and $P_{L,m}$ to be output are represented by Equations 23 and 25, respectively.

$$P_{U,m} = \underset{-N_s/4}{CyclicShift}\{Z_m + \overline{Z_m^*}\} \quad \text{[Equation 24]}$$

$$P_{L,m} = \underset{N_s/4}{CyclicShift}\{Z_m - \overline{Z_m^*}\} \quad \text{[Equation 25]}$$

The candidate signal generator 110 performs parallel/series conversion on each of the output vectors $P_{U,m}$ and $P_{L,m}$ (409 and 410), and then generates a real part modulated signal and an imaginary part modulated signal by performing filtering using a PPN (411 and 412).

Thereafter, the candidate signal generator 110 overlaps the real part modulated signal and the imaginary part modulated signal with a difference of half a symbol period in a time domain on the basis of a switching control bit $S_2^{(v)}$ that is determined according to the applied phase offset (413). Specifically, when $S_2^{(v)}=0$, the candidate signal generator 110 may overlap an imaginary part modulated signal, which is output from a lower PPN, and a real part modulated signal, which is output from an upper PPN, after delaying the imaginary part modulated signal by T/2. On the contrary, when $S_2^{(v)}=1$, the candidate signal generator 110 may overlap a real part modulated signal, which is output from an upper PPN, and an imaginary part modulated signal, which is output from a lower PPN, after delaying the real part modulated signal by T/2.

Then, the candidate signal generator 110 generates a candidate transmission signal by selectively multiplying an imaginary number j to the signal which is a superposition of the real part modulated signal and the imaginary part modulated signal in accordance with the switching control bit $S_2^{(v)}$ (414). Specifically, when $S_2^{(v)}=0$, the candidate signal generator 110 generates a candidate transmission signal to which the imaginary number j is not multiplied. On the contrary, when $S_2^{(v)}=1$, the candidate signal generator 110 generates a candidate transmission signal to which the imaginary number j is multiplied.

Meanwhile, in the embodiment illustrated in FIG. 4, the switching control bits $S_1^{(v)}$ and $S_2^{(v)}$ are determined as shown in Table 1 above according to the applied phase offset and the candidate transmission signal generated according to $S_1^{(v)}$ and $S_2^{(v)}$ is obtained as Equation 8 above.

Meanwhile, in the embodiment shown in FIG. 2, DFT and IDFT which require complicated computation have to be performed several times to generate a plurality of candidate transmission signals, whereas in the embodiment shown in FIG. 4, a plurality of candidate transmission signals which are the same as in the embodiment shown in FIG. 2 can be generated by performing DFT and IDFT only once. Accordingly, in the embodiment shown in FIG. 4, the amount of computation may be reduced as compared to the embodiment shown in FIG. 2.

According to the embodiments of the present disclosure, it is possible to effectively improve a PAPR by generating a plurality of candidate transmission signals that are modulated in DFT spread FBMC/OQAM scheme and are capable of obtaining a single carrier effect and selecting and transmitting a candidate transmission signal having a low PAPR.

In addition, according to the embodiments of the present disclosure, a different phase offset is applied to a complex symbol to be transmitted according to a candidate transmission signal so that a candidate transmission signal transmitted from among a plurality of candidate transmission signals can be estimated based on the phase offset on a reception side, and hence transmission of side (additional) information is not required unlike a conventional art.

The methods and/or operations described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A modulation method comprising:
    generating a plurality of different candidate transmission signals by modulating a complex symbol vector including a plurality of complex symbols in a discrete Fourier transform (DFT) spread filter bank multi-carrier (FBMC)/offset quadrature amplitude modulation (OQAM) scheme; and
    selecting a candidate transmission signal having a lowest peak power or peak-to-average power ratio (PAPR) as a transmission signal,
    wherein the generating of the plurality of candidate transmission signals comprises applying a different phase offset to the complex symbol vector according to a candidate transmission signal to be generated; and the phase offset satisfies Equation 1 below:

$$\theta_v = \frac{(v-1)\pi}{2V}, v = 1, 2, \ldots, V \quad \text{[Equation 1]}$$

where $\theta_v$ denotes the phase offset, v denotes an index of a candidate transmission signal to be generated, and V denotes the number of the candidate transmission signals.

2. The modulation method of claim 1, wherein each of the plurality of candidate transmission signals is a superposition of a plurality of equally time-shifted subcarriers.

3. The modulation method of claim 1, wherein the generating of the plurality of candidate transmission signals comprises:

applying the different phase offset to the complex symbol vector according to a candidate transmission signal to be generated; and performing DFT on the complex symbol vector to which the phase offset is applied.

4. The modulation method of claim 3, wherein the generating of the plurality of candidate transmission signals further comprises:

dividing each of the symbols included in the complex symbol vector spread by the DFT into a real part symbol and an imaginary part symbol;

shifting a phase of each of the real part symbol and the imaginary part symbol;

generating a real part modulated signal and an imaginary part modulated signal using inverse discrete Fourier transform (IDFT) and a poly phase network; and overlapping the real part modulated signal and the imaginary part modulated signal with a time difference corresponding to half of a symbol period.

5. The modulation method of claim 4, wherein the shifting of the phase comprises:

shifting the phase of each of the real part symbol and the imaginary part symbol by multiplying each of the real part symbol and the imaginary part symbol by a phase shift coefficient that satisfies Equation 2 below:

$$\eta_n = j^n, \mu_n = j(-j)^n \quad \text{[Equation 2]}$$

where $\eta_n$ denotes a phase shift coefficient to be multiplied to a real part symbol to be transmitted over an $n^{th}$ subcarrier, $\mu_n$ denotes a phase shift coefficient to be multiplied to an imaginary part symbol to be transmitted over the $n^{th}$ subcarrier, n denotes a real number satisfying $0<n<N-1$, and N denotes a number of subcarriers.

6. The modulation method of claim 4, further comprising, after overlapping the real part modulated signal and the imaginary part modulated signal, selectively multiplying an imaginary number j to a signal obtained by the overlapping based on an index of a candidate transmission signal to be generated, wherein:

the generating of the real part modulated signal and the imaginary part modulated signal comprises selectively cyclically shifting an output vector of the IDFT by Ns/2 (here, Ns denotes a size of the output vector) based on the index and then performing filtering using the poly phase network, and the overlapping of the real part modulated signal and the imaginary part modulated signal comprises delaying the real part modulated signal or the imaginary part modulated signal by half of the symbol period based on the index.

7. The modulation method of claim 1, wherein the generating of the plurality of different candidate transmission signals comprises:

performing DFT on the complex symbol vector;

performing IDFT on the complex symbol vector spread by the DFT; and applying the different phase offset to an output vector of the IDFT according to a candidate transmission signal to be generated.

8. The modulation method of claim 7, wherein the generating of the plurality of different candidate transmission signals further comprises:

generating a first vector obtained by adding the output vector to which the phase offset is applied and a conjugate reverse vector for the output vector to which the phase offset is applied and a second vector obtained by subtracting the conjugate reverse vector from the output vector to which the phase offset is applied;

cyclically shifting the first vector and the second vector;

generating a real part modulated signal and an imaginary part modulated signal by performing filtering on each of the cyclically shifted first vector and the cyclically shifted second vector using a poly phase network; and overlapping the real part modulated signal and the imaginary part modulated signal with a time difference corresponding to half of a symbol period.

9. The modulation method of claim 8, wherein the generating of the plurality of different candidate transmission signals further comprises selectively multiplying an imaginary number j to a signal obtained by the overlapping based on an index of a candidate transmission signal to be generated, the cyclically shifting comprises cyclically shifting one of the first vector and the second vector by Ns/4 (here, Ns is a size of the output vector) based on the index and cyclically shifting the other of the first vector and the second vector by −Ns/4 (here, Ns is a size of the output vector), and the generating of the real part modulated signal and the imaginary part modulated signal comprises delaying the real part modulated signal or the imaginary part modulated signal by half of the symbol period based on the index.

* * * * *